Patented Feb. 15, 1944

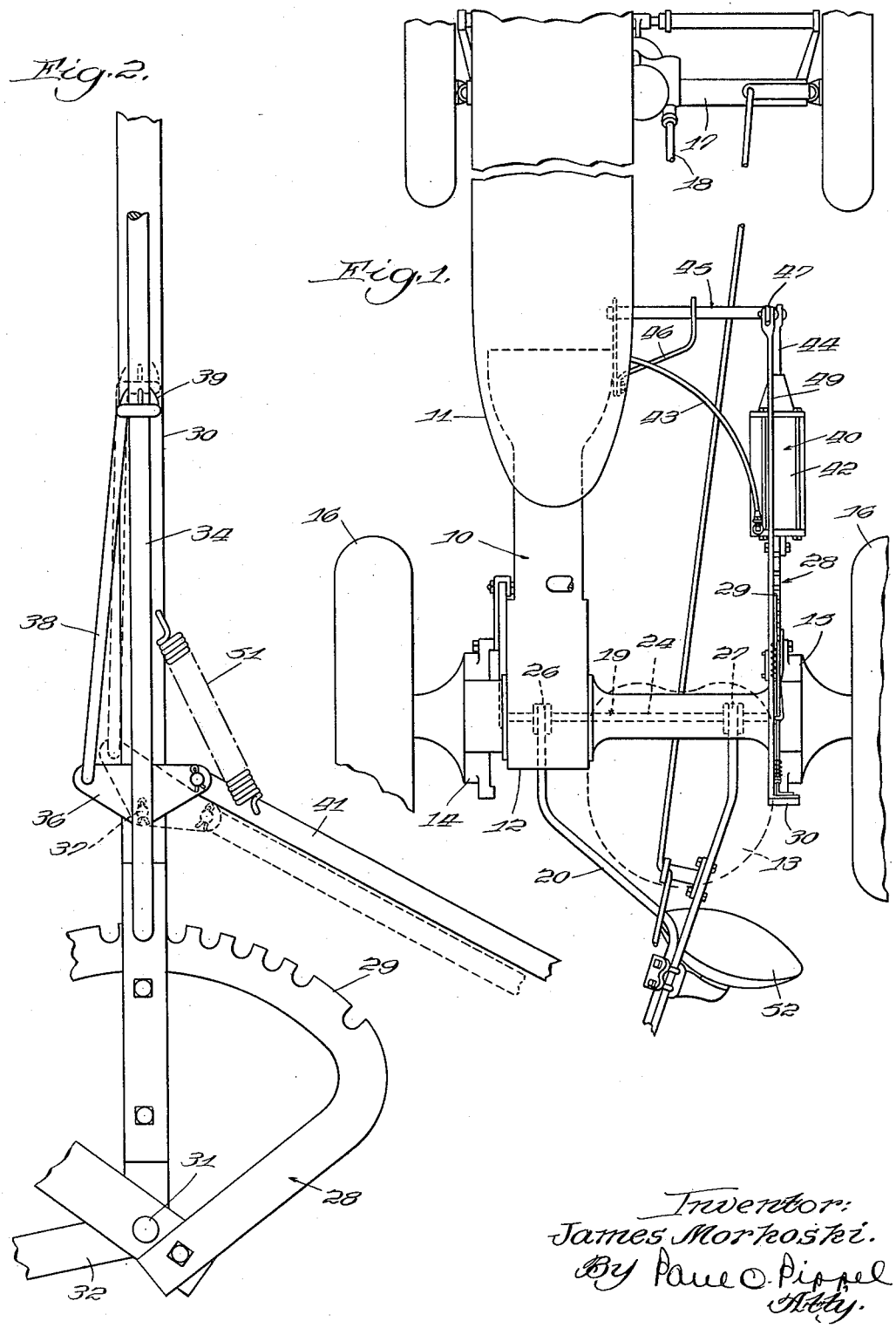

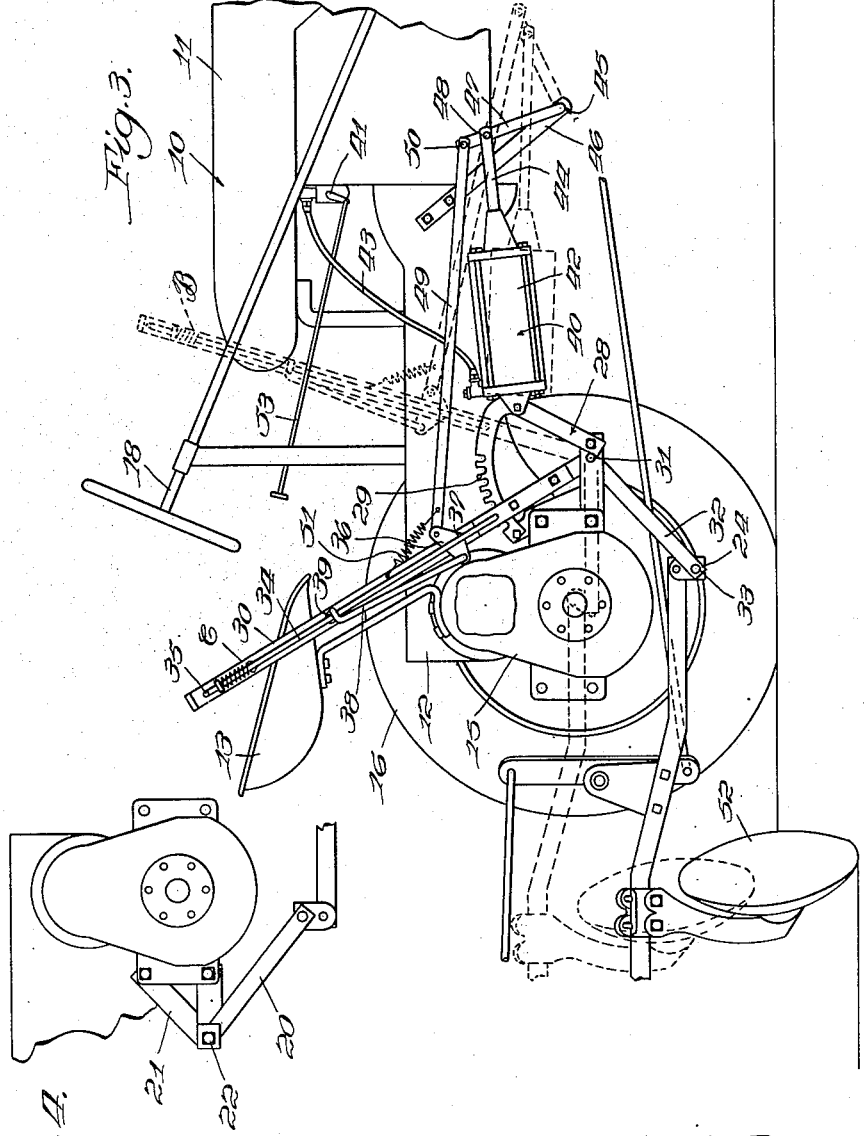

2,341,802

UNITED STATES PATENT OFFICE 2,341,802

AGRICULTURAL IMPLEMENT

James Morkoski, Canton, Ill., assignor to International Harvester Company, a corporation of New Jersey Application January 2, 1942, Serial No. 425,407

8 Claims. (Cl. 97—50)

This invention relates to agricultural implements and, more particularly, to tractor-mounted implements having parts adapted for movement to and from their working position and relative to the tractor or other tool-supporting structure.

It is an object of the present invention to provide a combined manual and power-adjusting mechanism for direct-connected implements.

It is another object of the invention to provide an arrangement of manual and power-adjusting devices, wherein the vision of the operator immediately forward of his station on the tractor is not impaired.

According to the present invention, there is provided a combined manual and power mechanism so arranged that adjustment of the working tool relative to the tractor or tool-supporting means may be made either by the manual lever or by the power-actuated device. The manual-actuating means includes a quadrant and an adjusting lever adjusted to work the quadrant, and a detent mechanism carried by the adjusting lever and adapted to engage with the quadrant. The power device is connected directly to the manual adjusting lever and, in this connection, there is provided a lost-motion device adapted to be operable upon the detent mechanism to automatically disengage the same when power is applied to the lever to effect adjustment of the working-tool structure by the power device. When the power device is in its collapsed or unextended position, there is provided lost-motion whereby the manual lever can function to regulate the working depth of the working-tool structure or to effect lifting of the working-tool structure by hand. This combined manual and power-adjusting mechanism is so arranged on the tractor that the vision of the operator immediately forward of the station is not impaired. The power cylinder device is located in alinement with the manual adjusting means and at a location laterally spaced from the side of the tractor and from the center line of vision of the operator.

For other objects and for a better understanding of the invention, reference may be had to the following detailed description taken in connection with the accompanying drawings, in which:

Figure 1 is a plan view of the tractor and of the implement embodying the features of the present invention attached thereto;

Figure 2 is an enlarged detail view of the manual adjusting mechanism and of the automatic power disengaging means for the detent mechanism;

Figure 3 is a side elevational view of a portion of the tractor shown in Figure 1 and of the implement with its accompanying combined manual and power-adjusting mechanism connected with the tractor; and Figure 4 is a detail view in elevation showing a portion of the connecting structure for the implement and its connection with one of the depending axle housings of the tractor.

Referring now to the figures, there is shown a tractor 10 having a longitudinally extending offset body portion 11 and a rear axle structure 12. This rear axle structure 12 extends to a greater distance on one side of the offset body portion and has on this extension an operator's station 13. Depending from the rear axle structure are two depending axle housings 14 and 15, to which are respectively connected traction wheels 16. The forward portion of the longitudinal body portion 11 is supported on a dirigible wheel structure 17 adapted to be steered from a steering mechanism 18 accessible to the operator's station 13 on the rear axle structure. It should thus be apparent that with a tractor so constructed the operator has substantially clear vision immediately forwardly of the operator's station.

Connected to the depending axle housings of the tractor, by means of a connecting bail structure 19, is a working-tool structure 20. The connection of the structure 19 with the depending axle housing 14 is made by means of a bracket structure 21 extending forwardly from the depending axle housing. The bail-connecting structure is pivoted to this bracket 21, as indicated at 22, see Figure 4. The bail-connecting structure 19 further includes a transverse shaft 24 to which attaching portions 26 and 27 of the implement 20 are connected for pivotal movement. At the right side of the tractor there is provided on the depending axle housing 15 a manually adjustable mechanism 28 including a quadrant 29 and an adjusting lever 30 pivotable about a pivotal point 31 on the quadrant 29. This adjusting lever 30 has an arm 32 rigidly connected to its lower end, which forms a part of the bail-connecting structure, to the lower end of which is connected the shaft 24, as indicated at 33. It should now be apparent that any movement of the adjusting lever 30 over the quadrant 29 will cause movement of the working-tool structure with respect to the tractor or tool-supporting means 10. The implement shown in the drawings is a disk plow which is normally supported at its rearward end on a furrow wheel supporting structure, not shown. Pivotal movement of the implement is thus made about the furrow wheel supporting structure which always remains on the ground. While this type of implement has been shown, it should be understood that any type of implement may have associated with it the features of the present invention; that is, the features of the present invention can be readily applied to implements which are completely and bodily lifted out of their ground-working position and into a transport position on the tractor.

The adjusting lever 30 has the usual detent mechanism 34 adapted to engage with the notches of the quadrant 29. At the upper end of the lever, there is supplied the usual hand grip 35 for operating the detent mechanism by hand. It should be noted that the manual adjusting lever 30 and the hand grip 35 are readily accessible to the operator's station 13.

Also carried on the lever 30 is a bell-crank lever 36 pivoted at 37 thereon. One arm of the bell-crank lever is connected by means of a link 38 with the detent mechanism 34. The connection of the link 38 with the detent mechanism 34, as indicated by a stop 39 on the detent mechanism 34, is such as to provide lost motion between the link 38 and the detent mechanism, whereby the detent mechanism 34 may be operated manually and independently of the link 38. Associated with the tractor is a fluid power mechanism indicated generally at 40. This power mechanism is preferably of the type disclosed in the pending application to Carl W. Mott, Serial No. 353,099, filed August 17, 1940, and relating to a type of power mechanism adapted to utilize the exhaust gases from the tractor power plant for the supply of fluid to a fluid-actuated device. As shown particularly in Figure 3, these exhaust gases are taken from the tractor power plant through a valve control mechanism 41 and delivered to a fluid-actuated device 42 by means of a fluid coupling 43. The fluid-actuated device 42 is of the fluid-expansible cylinder type and includes a piston rod 44. This fluid-actuated device 42 is directly connected to the manual adjusting mechanism 28 and is thus in longitudinal alinement with the depending axle housing 15 and laterally removed from the longitudinally extending body portion 11 of the tractor. By having the fluid-actuated device so located, the vision of the operator immediately ahead of his station is not impaired. The forward end of the cylinder device 42 has its connecting rod 44 connected with a transversely extending rockable structure 45 adapted to be supported by means of a bracket 46 on the longitudinally extending body portion 11. This transverse rockable structure takes the form of a crank arm and is pivotable in the bracket 46, and has a vertically extending arm 47, to which the piston rod 44 is connected, as indicated at 48. The outer end of the arm 47 is connected with the bell-crank 36 by means of a connecting link 49. The connection of the connecting link 49 is made with the arm 47, as indicated at 50. In order to keep the bell-crank 36 and its link 38 in its unextended position, there is provided a tension spring 51 extending between the lever 30 and the link 49. This spring 51 also serves to collapse the fluid cylinder device 42 as fluid is withdrawn from the same.

The fluid cylinder device 42 is of the single-acting type and by being of this form manual adjustment of the manual adjusting mechanism may be effected independently of the power mechanism. When the working tool structure is in its ground-working position, as shown in Figure 3, the manual adjusting lever may be operated to vary the working depth of a working tool 52 of the working-tool structure 20. The disengagement of the detent mechanism 34 is effected through the manual grip 35, and the stop 39 will leave the link 38. The piston rod 44 will merely slide in the cylinder device 42.

When it is desired to lift the implement completely out of its ground-working position, the power mechanism 40 is used. The operator will grasp a manual control rod 53 and exhaust fluid gases will flow to the fluid cylinder device 42. The fluid cylinder device will thus be extended, and the rockable structure 45 will be rocked in a clockwise direction, taking with it the link 49. Since this link 49 is connected to the bell-crank 36, the bell-crank will be pivoted and the link 38 will abut the stop 39 of the detent mechanism 34 to automatically disengage the detent mechanism 34 with the quadrant 29. It should thus be apparent that the means for connecting the power mechanism with the manual adjusting lever 30 includes means for automatically disengaging the detent mechanism.

As fluid is removed from the fluid cylinder device 42, upon the operator giving a return movement to the control rod 53, the working tool will return toward its ground-working position under its own weight, taking with it the adjusting lever 30. The adjusting lever 30 will then be returned from its position shown in dotted lines at B to a position similar to that shown in full lines at C. The operator, on the operator's station 13, can stop the adjusting lever in any position over the quadrant 29. The operator need only place his hand in back of the lever and the rearward movement of the same will be stopped, thereby allowing the detent mechanism to register with one of the notches in the quadrant 29. The spring 51 will have functioned to withdraw the link 38 from the stop 39 on the detent mechanism 34. Once the exhaust gases have been totally removed from the fluid cylinder device 42, the hand lever can be operated over the quadrant to locate its detent mechanism in any of the notches on the quadrant.

It should now be apparent that there has been provided a combined manual and power-adjusting mechanism which may be operated manually and by power independently of each other for the purpose of moving implements from one position to another position with respect to the tractor or their tool-supporting structure. It should also be apparent that there has been provided in this combination of mechanisms means for automatically disengaging the detent mechanism of the adjusting lever as power is applied to the power mechanism. It should also be further apparent that the arrangement of these mechanisms with respect to the operator's station is such that the vision of the operator is not impaired. Also, the manually adjustable means serves as a support for the fluid-actuated device forming part of the power mechanism.

While various changes may be made in the detail construction of the present invention, it will be understood that such changes shall be within the spirit and scope of the present invention as defined by the appended claims.

What is claimed is:

1. In combination, a tool-supporting structure, a working-tool structure connected to the tool-supporting structure for moving the working tool to and from ground-working position, manually adjustable means on the tool-supporting structure to move the working tool structure, said manually adjustable means including an adjusting lever movable in a fixed path and means for locking said lever against movement at spaced points in said path, power-operated means, linkage connecting said adjusting lever and said power-operated means, and means responsive to the actuation of said power-operated means for unlocking said lever to permit movement thereof.

2. In combination, a tool-supporting structure, a working-tool structure connected to the tool-supporting structure for moving the working tool to and from ground-working position, manually adjustable means on the tool-supporting structure to move the working tool structure, said manually adjustable means including an adjusting lever movable in a fixed path and means for locking said lever against movement at spaced points in said path, power-operated means, linkage connecting said adjusting lever and said power-operated means, said power-operated means including a single-acting fluid cylinder device arranged to actuate said adjusting lever to raise the working-tool from ground-working position, means responsive to the actuation of said power-operated means for unlocking said lever to permit movement thereof including rockable means pivoted on the lever and arranged to engage said locking means, and means connected between said lever and said linkage adapted to bias said rockable means out of engagement with said locking means.

3. In combination, a tool-supporting structure, a working-tool structure connected to the tool-supporting structure for moving the working tool to and from ground-working position, manually adjustable means on the tool-supporting structure to move the working tool structure, said manually adjustable means including a quadrant, an adjusting lever adapted to work over the quadrant, and a detent mechanism on the lever adapted to engage the quadrant, power-operated means, and linkage connecting the power-operated means to the adjusting lever including rockable means pivoted on the adjusting lever and connected to said detent mechanism, whereby said detent mechanism is released from engagement with the quadrant upon actuation of the adjusting lever by the power-operated means.

4. In combination, a tool-supporting structure, a working-tool structure connected to the tool-supporting structure for moving the working tool to and from ground-working position, manually adjustable means on the tool-supporting structure to move the working tool structure, said manually adjustable means including a quadrant, an adjusting lever adapted to work over the quadrant, and a detent mechanism on the lever adapted to engage the quadrant, means associated with the adjusting lever for manually disengaging the detent mechanism from the quadrant, power-operated means, rockable means pivoted on the said adjusting lever adapted to engage said detent mechanism, and linkage connecting the power-operated means to the rockable means whereby to disengage said detent mechanism from the quadrant, independently of the manual means provided therefor, upon actuation of the adjusting lever by the power-operated means.

5. In combination, a tool-supporting structure, a working-tool structure connected to the tool-supporting structure for moving the working tool to and from ground-working position, manually adjustable means on the tool-supporting structure to move the working tool structure, said manually adjustable means including a quadrant, an adjusting lever adapted to work over the quadrant, and a detent mechanism on the lever adapted to engage the quadrant, power-operated means, linkage connecting the power-operated means and the adjusting lever arranged to actuate the adjusting lever to raise the working tools from ground-working position, said linkage including a bell-crank pivoted on the lever, means for connecting the bell-crank to the detent mechanism, and means biasing the bell-crank out of engagement with the detent mechanism.

6. In combination, a tool-supporting structure, a working-tool structure connected to the tool-supporting structure for moving the working tool to and from ground-working position, manually adjustable means on the tool-supporting structure to move the working tool structure, said manually adjustable means including a quadrant, an adjusting lever adapted to work over the quadrant, and a detent mechanism on the lever adapted to engage the quadrant, power-operated means supported by the said manually adjustable means in longitudinal alinement therewith, linkage connecting the power-operated means to the lever, and means interposed between the linkage and the lever arranged to disengage said detent mechanism in response to the actuation of the power-operated means.

7. In combination, a tool-supporting structure, a working-tool structure connected to the tool-supporting structure for moving the working tool to and from ground-working position, manually adjustable means on the tool-supporting structure to move the working tool structure, said manually adjustable means including a quadrant, an adjusting lever adapted to work over the quadrant, and a detent mechanism on the lever adapted to engage the quadrant, power-operated means supported by the said manually adjustable means in longitudinal alinement therewith, linkage connecting the power-operated means to the lever, and rockable means interposed between the linkage and the lever arranged to engage said detent mechanism in response to the actuation of the power-operated means and move it out of contact with the quadrant, and means connected between the said lever and the rockable means arranged to bias the rockable means out of engagement with the detent mechanism.

8. In combination, a tool-supporting structure, a working-tool structure connected to the tool-supporting structure for moving the working tools to and from ground-working position, manually adjustable means on the tool-supporting structure connected to the working-tool structure to move the same, said manually adjustable means including a quadrant, an adjusting lever adapted to work over the quadrant, and a detent mechanism on the lever adapted to engage the quadrant, power-operated means, linkage connecting the power-operated means to the lever, said power-operated means including a single acting fluid cylinder device arranged to actuate the said lever in the direction of implement lifting, means interposed between the said linkage and the lever arranged to engage the detent mechanism and to lift it from the quadrant upon actuation of the fluid cylinder device, said last mentioned means including a rockable member pivoted upon the adjusting lever, and resilient means connecting said lever and said linkage arranged to bias the rockable member out of engagement with the said detent mechanism.

JAMES MORKOSKI.